United States Patent
Woo

[11] Patent Number: 5,875,521
[45] Date of Patent: Mar. 2, 1999

[54] APPARATUS FOR OPERATING A FRONT DOOR OF A VCR

[75] Inventor: Ji-Sung Woo, Seoul, Rep. of Korea

[73] Assignee: Daewoo Electronics Co., Ltd., Rep. of Korea

[21] Appl. No.: 919,800

[22] Filed: Aug. 29, 1997

[30] Foreign Application Priority Data

Aug. 31, 1996 [KR] Rep. of Korea ................... 1996-37651

[51] Int. Cl.⁶ ...................................................... E05F 1/14
[52] U.S. Cl. ........................... 16/280; 16/285; 312/319.2; 312/328; 49/326; 360/96.5
[58] Field of Search ............... 16/280, 304, 307, 16/293, 295; 312/327, 328, 319.1, 319.2; 369/77.1; 360/96.5; 49/326

[56] References Cited

FOREIGN PATENT DOCUMENTS 2 295 262 5/1996 United Kingdom .

Primary Examiner—Brian K. Green
Assistant Examiner—Daniel Gambrill
Attorney, Agent, or Firm—Pillsbury Madison & Sutro

[57] ABSTRACT

An apparatus for operating a front door of a VCR to enable the front door to pivot inward and outward with respect to the VCR. The apparatus has a door supporting member integrally formed at ends thereof with a first pivot shaft and a second pivot shaft respectively, a first bracket for rotatably supporting the first pivot shaft, a second bracket for rotatably supporting the second pivot shaft, a first spring device for returning the door to an initial position where the door closes the cassette inlet, and a second spring device for pivoting the door inward. The first spring device has a first flange and a first spring, and the second spring device has a second flange and a second spring. The apparatus can simplify the structure of a VCR and can prevent a door and a VCR case from colliding with each other, thereby reducing the noise generated by the VCR.

10 Claims, 5 Drawing Sheets

APPARATUS FOR OPERATING A FRONT DOOR OF A VCR

BACKGROUND OF THE INVENTION

1. Field of the Invention

The present invention relates to a VCR, and more particularly to an apparatus for operating a front door of a VCR which allows the front door to pivot about pivot shafts lowered and outward with respect to the VCR.

2. Description of the Prior Art

Generally, a VCR is a device for recording/reproducing a signal on/from a magnetic tape. A VCR comprises a loading mechanism for loading or unloading a cassette, a reel driving mechanism for running a tape, and a head section for recording/reproducing visual and sound signals on/from a magnetic tape.

The loading system of a VCR comprises a sensor which detects a cassette when the cassette enters a predetermined distance into the VCR and sends a signal to an ECU, a lever for pivoting a front door of the VCR, a cassette holder for settling the cassette in a loading position, and a loading motor. A cassette inlet is formed at the front wall of the VCR. The cassette inlet is opened/closed by a front door hinged to an upper end thereof so that damage to elements installed inside of the VCR caused by impurities is avoided. When the cassette is being inserted into the VCR, the door should smoothly pivot so that the cassette can be easily inserted into the VCR.

FIG. 1 shows an operating mechanism of a front door 4 for a conventional VCR. As shown in FIG. 1, the conventional VCR is formed at the front wall thereof with a cassette inlet 3 for inserting and withdrawing a cassette 2 which is shown in FIG. 2. A bracket 8 having a blind hole 9 is fixedly provided on an inner surface of a VCR case 1 adjacent to the upper portion of cassette inlet 3. A rotating shaft 5 is integrally formed with the top end of door 4, and a free end of rotating shaft 5 is rotatably inserted into blind hole 9, thereby supporting door 4.

Since the pivoting of the bottom end of door 4 is blocked by the inner lower surface of VCR case 1, door 4 can only pivot inward with respect to VCR case 1 about rotating shaft 5. A spring 6 is inserted around an end portion of rotating shaft 5. One end of spring 6 is supported at the inner surface of VCR case 1, and the other end makes contact with the inner surface of door 4, thereby forcing door 4 outward with respect to the VCR, that is, in the direction in which door 4 closes cassette inlet 3.

As shown in FIG. 2, a lever 10, which operates when cassette 2 is inserted into cassette inlet 3, is installed inside of the VCR. Lever 10 is integrally formed at a lead end thereof with a bending part 11. Door 4 is formed at the inner wall thereof with a latch 7 for latching bending part 11, and latch 7 is positioned in correspondence to a position of bending part 11.

While cassette 2 is being inserted into the VCR, door 4 makes contact with one end of cassette 2 so that door 4 is pivoted upward about rotating shaft 5. Accordingly, cassette inlet 3 is opened, thereby allowing cassette 2 to enter the VCR. Next, cassette 2 is caught by a cassette holder 13 installed inside of the VCR. When cassette 2 has entered a predetermined distance into the inside of the VCR through cassette inlet 3, a sensor (not shown) detects cassette 2 and sends a cassette detecting signal to an ECU. As a result, cassette holder 13 is driven so as to settle cassette 2 in a loading position. On the other hand, the movement of cassette holder 13 causes lever 10 to swing. Consequently, bending part 11 formed at the lead end of lever 10 is turned with respect to a hinge 12, and forces door 4 to pivot about rotating shaft 5 upward and inward with respect to the VCR, thereby opening cassette inlet 3 as shown in FIG. 3.

By the pivot movement of door 4, cassette 2 can easily enter into the inside of the VCR. In the above-mentioned state, door 4 is being forced downward by spring 6. When cassette 2 has been loaded, door 4 is pivoted downward by spring 6, thereby rapidly closing cassette inlet 3.

On the other hand, as shown in FIG. 3, when cassette 2 is withdrawn, cassette holder 13 is driven, and subsequently, lever 10 turns counter-clockwise, thereby pulling door 4 inward with respect to the VCR. In this state, cassette 2 is partially ejected through cassette inlet 3. Thereafter, when cassette 2 is entirely drawn out of the VCR, door 4 is again pivoted downward by spring 6, thereby closing cassette inlet 3.

However, the conventional door operating mechanism has a complicated construction inside of the VCR. For example, it requires a separate element, such as lever 10, to open cassette inlet 3 when cassette 2 is being ejected. That is, since the conventional door 4 can pivot only to the inside of the VCR, the conventional mechanism requires an element for maintaining open cassette inlet 3 when cassette 2 is to be ejected. Also, it is required that the pivot movement of door 4 must be synchronized with the unloading of cassette 2. Therefore, since lever 10 which is driven together with cassette holder 13 is required, the construction becomes complicated. And, there is a difficulty in designing the VCR so that the phase of movement of door 4 with respect to the rotating angle of lever 10 is firmly established.

In addition, in the above-mentioned door operating mechanism, door 4 is pivoted toward VCR case 1 at a relatively high speed by the resilient force of spring 6, so door 4 collides with VCR case 1, thereby generating a relatively loud noise.

SUMMARY OF THE INVENTION

The present invention is intended to overcome the above described disadvantages. Therefore, it is an object of the present invention to provide an apparatus for operating a front door of a VCR which allows the front door to pivot inward and outward with respect to the VCR, which can simplify the inner construction of the VCR, and which can prevent the front door from colliding with the VCR case, thereby reducing the noise generated by the VCR.

In order to achieve the above object of the present invention, there is provided an apparatus for operating a front door of a VCR comprising:

a door supporting member integrally formed at an upper portion of the front door, the door supporting member being integrally formed at first and second ends thereof with a first pivot shaft and a second pivot shaft respectively, the first end being opposite to the second end, the first pivot shaft and the second pivot shaft extending in opposite direction from each other;

a first means for rotatably supporting the first pivot shaft;

a second means for rotatably supporting the second pivot shaft;

a third means for returning the front door to an initial position when the front door is pivoted inward with respect to the VCR about the door supporting member, the third means being provided between the first means and the front door, the cassette inlet being closed by the front door when the front door is in the initial position; and a fourth means for pivoting the front door inward with respect to the VCR about the door supporting member, the fourth means being provided between the second means and the front door, wherein the front door being pivoted inward with respect to the VCR by the fourth means is stopped at the initial position by the third means.

According to a preferred embodiment of the present invention, the first means includes a first bracket having a first blind hole, the second means includes a second bracket having a second blind hole. Free ends of the first and the second pivot shafts are rotatably inserted into the first and the second blind holes respectively, and the first and the second brackets are fixedly attached to an inner surface of the front wall of the VCR. The third means includes a first flange rotatably inserted around the first pivot shaft, a first spring which is positioned between the first flange and the first means so as to surround the first pivot shaft and a stopper for stopping the first flange at the initial position by preventing the first flange from pivoting outward with respect to the VCR. The stepper is integrally formed with the inner surface of the front wall of the VCR, and is positioned in correspondence to a position of the first flange.

The fourth means includes a second flange rotatably inserted around the second pivot shaft, a second spring which is positioned between the second flange and second means and surrounds the second pivot shaft, and a cutting hole for allowing the second flange to pivot outward with respect to the VCR. The cutting hole is formed at an upper portion of the cassette inlet.

The first spring has a first elasticity coefficient larger than a second elasticity coefficient of the second spring so that a first force acting on the floor door by the first flange is larger than a second force acting on the front door by the second flange.

When the cassette is inserted into the cassette inlet, the door is pivoted inward with respect to the VCR. When the cassette is entirely inserted into the VCR, the door is pivoted outward with respect to the VCR by the first flange. The first flange is stopped by the stopper at the initial position, so the door is stopped at the initial position by the first and second flange. On the other hand, when the cassette is ejected, the second flange pivots together with the door while the first flange maintains the initial position. When the cassette is entirely drawn out of the VCR, the door returns to the initial position by the second flange.

The apparatus for operating the front door of the VCR according to the present invention has advantages that it can accommodate the inserting and the withdrawing of a cassette, and that there is no need to provide a separate element for opening a cassette inlet before the cassette is ejected so the inner construction of the VCR is simplified and the cost for manufacturing the VCR is reduced, the apparatus according to the present invention can reduce a noise generated by the collision of the door and the VCR case.

BRIEF DESCRIPTION OF THE DRAWINGS

The shows object and other advantages of the present invention will become more apparent by describing in detail a preferred embodiment thereof with reference to the attached drawings in which.

DETAILED DESCRIPTION OF THE INVENTION

Hereinafter, an apparatus for operating a front door of a VCR according to a preferred embodiment of the present invention will be explained in more detail with reference to the accompanying drawings.

Figure 1:
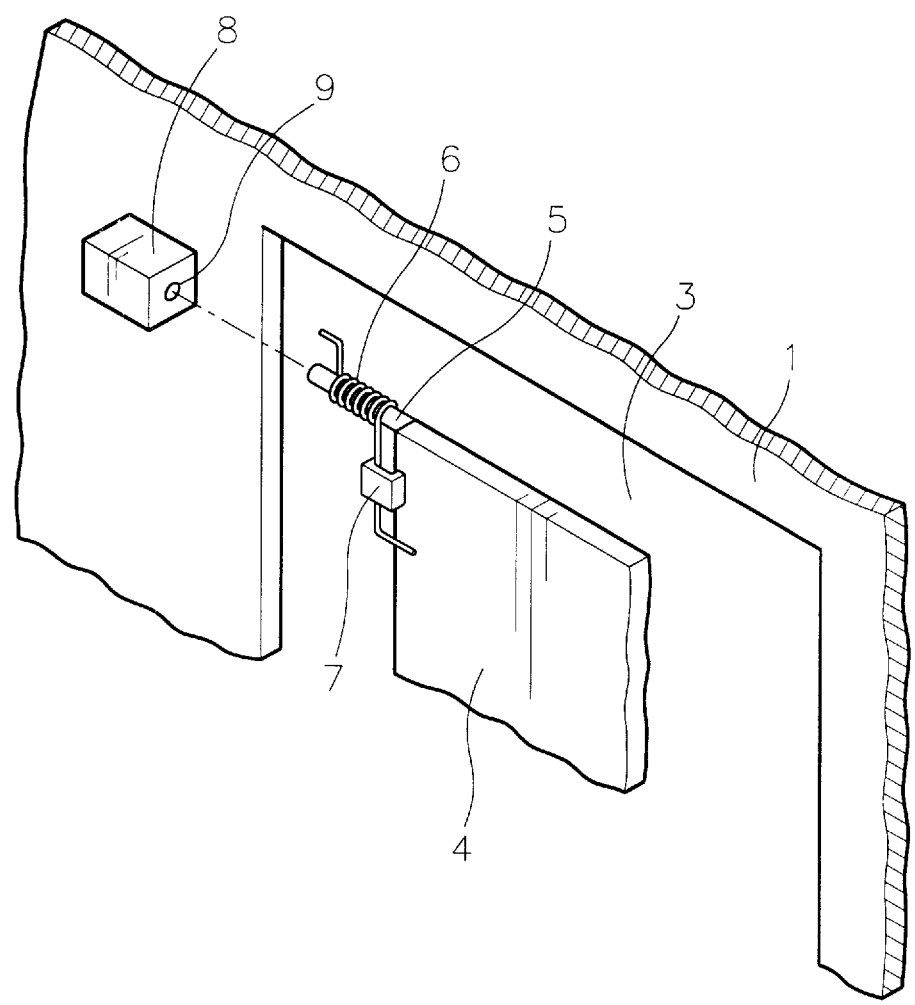
FIG. 1 is an exploded perspective view showing a door operating mechanism of a conventional VCR.
Figure 2:
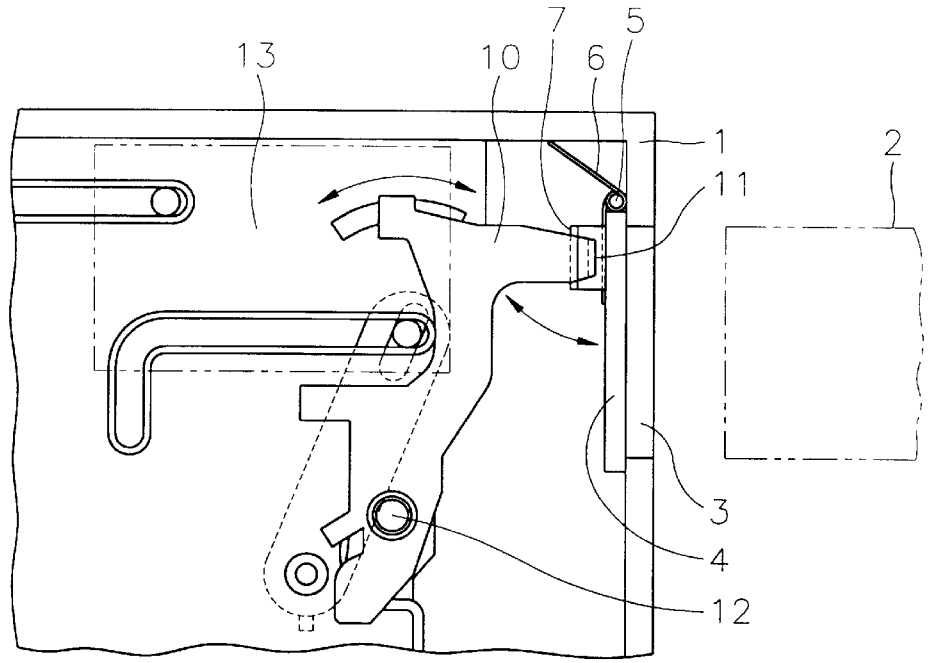
FIG. 2 is a side cross-sectional view showing an inner construction of the conventional VCR when the door of the conventional VCR is closing a cassette inlet.
Figure 3:
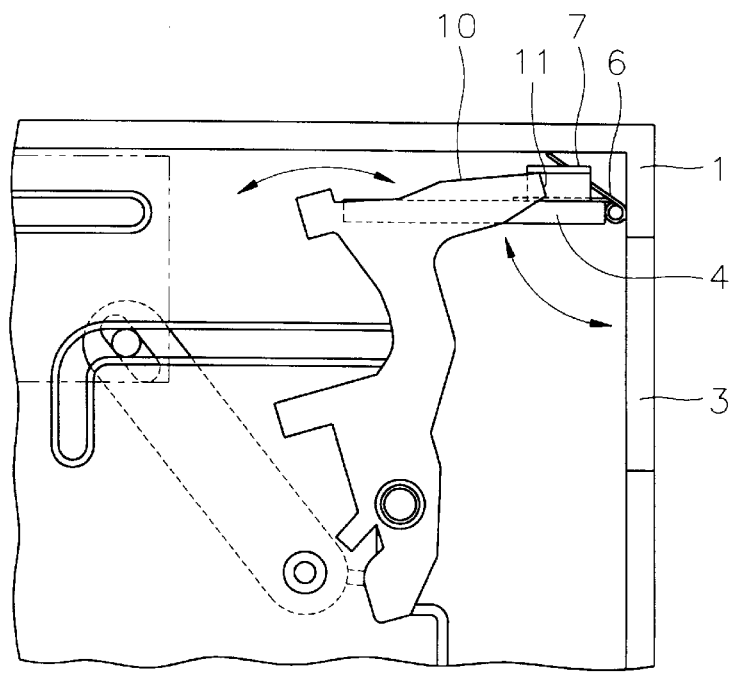
FIG. 3 is a side cross-sectional view showing an inner construction of the conventional VCR when the door of the conventional VCR is opening a cassette inlet.
Figure 4:
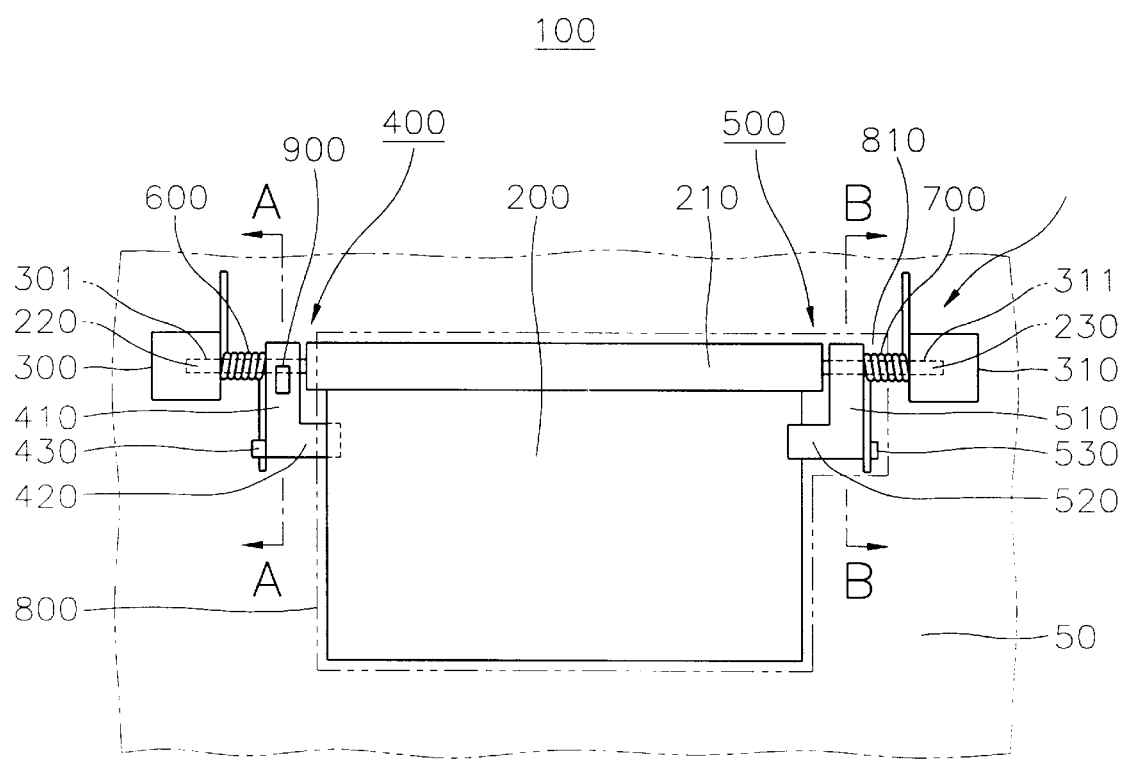
FIG. 4 is a front view showing an apparatus for operating a front door of a VCR according to the present invention.

FIG. 4 shows an apparatus 100 for operating a front door 200 according to the present invention. As shown in FIG. 4, the apparatus 100 for operating a front door 200 comprises a door supporting member 210 integrally formed at the top end of door 200 for opening/closing a cassette inlet 800 formed at the front wall of a VCR. According to the preferred embodiment of the present invention, door supporting member 210 has a cylindrical shape. Door supporting member 210 is integrally formed at a first end and a second end thereof with a first pivot shaft 220 and a second pivot shaft 230, respectively.

First pivot shaft 220 and second pivot shaft 230 extend in opposite directions from each other. At the inner side of the front wall adjacent to the upper portion of cassette inlet 800 of the VCR, there are fixedly attached a first bracket 300 and a second bracket 310 which are opposite to each other. First bracket 300 and second bracket 310 have a first blind hole 301 and a second blind hole 311, respectively. The free ends of a first pivot shaft 220 and second pivot shaft 230 are rotatably inserted into first blind hole 301 and second blind hole 311, respectively. First and second blind holes 301 and 311 also prevent door 200 from horizontally sliding.

Provided between first bracket 300 and door 200 are a first spring 600 and a first flange 400 which are inserted around first pivot shaft 220 to pivot door 200, which has been pivoted inward with respect to the VCR during insertion of a cassette (not shown), outward with respect to the VCR. Similarly, between second bracket 310 and door 200, a second spring 700 and a second flange 500 are inserted around second pivot shaft 230 to pivot door 200, which has been pivoted outward with respect to the VCR during ejection of the cassette, inward with respect to the VCR.

Figure 5:
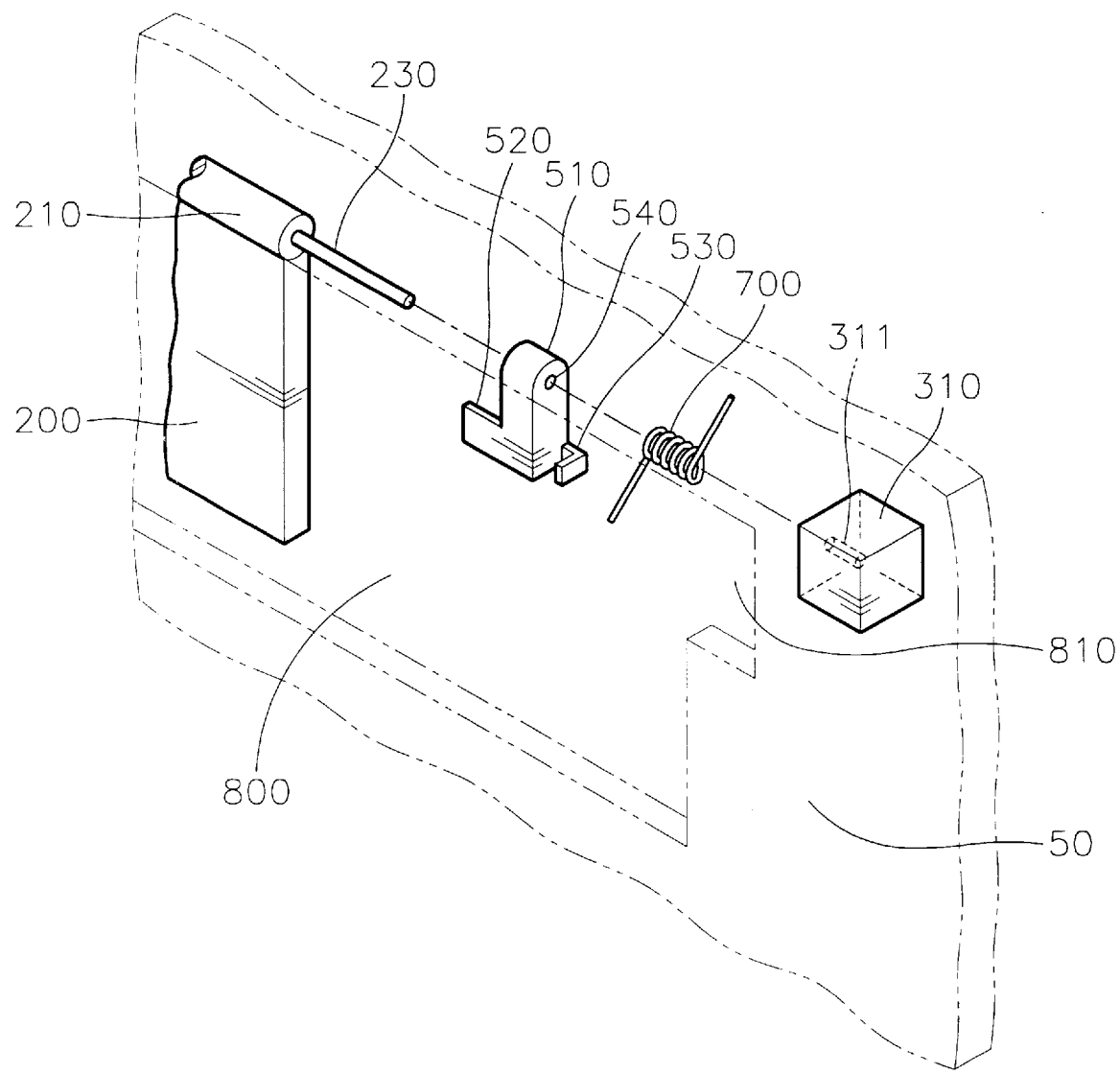
FIG. 5 is an exploded perspective view showing the apparatus for operating the front door of the VCR according to the present invention.

FIG. 5 is an exploded perspective view showing second pivot shaft 230, second flange 500, second spring 700, and second bracket 310. As described above, second flange 500, second spring 700 are inserted around second pivot shaft 230. A free end of pivot shaft 230 is rotatably inserted into second blind hole 311 of second bracket 310. Second flange 500 consists of a vertical part 510 and a horizontal part 520, and a hole 540 is formed at the upper portion of vertical part 510 so that second flange 500 is pivotably inserted around second pivot shaft 230. Horizontal part 520 makes contact with the outer surface of door 200, thereby forcing door 200 inward with respect to the VCR. Second spring 700 is located between second flange 500 and second bracket 310, and surrounds second pivot shaft 230. One end of second spring 700 makes contact with the inner surface of the front wall of the VCR, and the other end of second spring 700 is supported by a latch 530 formed at the lower portion of vertical part 510 of second flange 500.

The construction of first pivot shaft 220, first flange 400, first spring 600, and first bracket 300 is the same as the construction of second pivot shaft 230, second flange 500, second spring 700, and second bracket 310, except that a horizontal part 430 of first flange 400 has a function of pivoting door 200 outward with respect to the VCR by making contact with the inner surface of door 200.

Preferably, first and second springs 600 and 700 are torsion springs, the elasticity coefficient of first spring 600 is larger than the elasticity coefficient of second spring 700, and the force acting on door 200 by first flange 400 is substantially larger than the force acting on door 200 by second flange 500, so that, in a steady state, door 200 is pivoted outward and upward with respect to the VCR. To maintain door 200 at a position where door 200 closes cassette inlet 800, a stopper 900 is integrally formed with the inner surface of the front wall of the VCR, wherein stopper 900 is positioned in correspondence to a position of first flange 400. First flange 400 is maintained in a stopped position by stopper 900, that is, first flange 400 cannot pivot outward with respect to the VCR about first pivot shaft 220 beyond an initial position where door 200 closes cassette inlet 800.

On the other hand, a cutting hole 810 is formed at the upper portion of cassette inlet 800. Cutting hole 810 is positioned in correspondence to a position of second flange 500, allowing second flange 500 to pivot outward with respect to the VCR. Referring to FIGS. 4 and 5, cutting hole 810 is a rectangular-shaped hole.

Hereinafter, the operation of apparatus 100 according to the present invention will be explained with reference to FIGS. 6 and 7.

Figure 6:
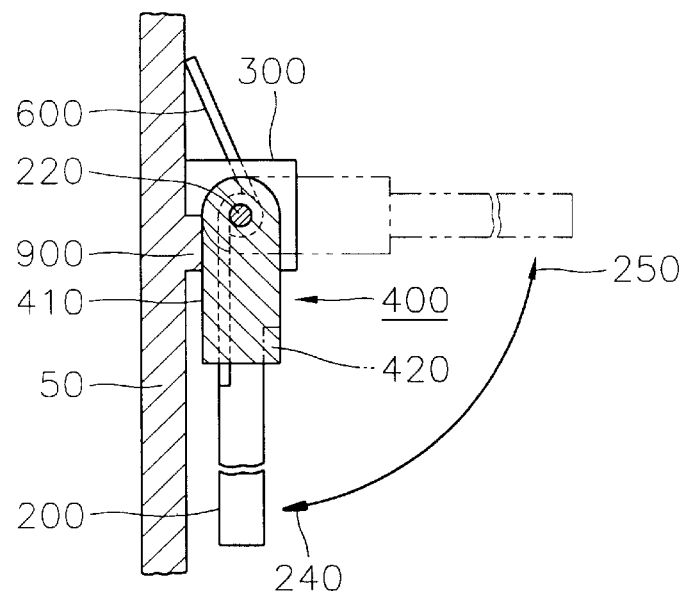
FIG. 6 is a cross-sectional view taken along line A—A of FIG. 4.

FIG. 6 shows door 200 and first flange 400 while the cassette is being inserted into the VCR. When the cassette is entirely inserted into the VCR through cassette inlet 800, door 200 that has been pivoted inward with respect to the VCR as shown in a dotted line in FIG. 6, that is in the direction of an arrow 250, is pivoted outward with respect to the VCR, that is in the direction of an arrow 240, by horizontal part 420 of first flange 400 which makes contact with the inner surface of door 200. Meanwhile, at the same time, horizontal part 520 of second flange 500 also applies a force to the outer surface of door 200 in the direction of arrow 250, but the force applied to door 200 by first flange 400 is larger than the force acting on door 200 by second flange 500, so second flange 500 is pivoted together with door 200 in the direction of arrow 240. When door 200 reaches the initial position where door 200 closes cassette inlet 800, first flange 400 is stopped by stopper 900, and consequently, door 200 is stopped at the initial position by horizontal part 520 of second flange 500.

Figure 7:
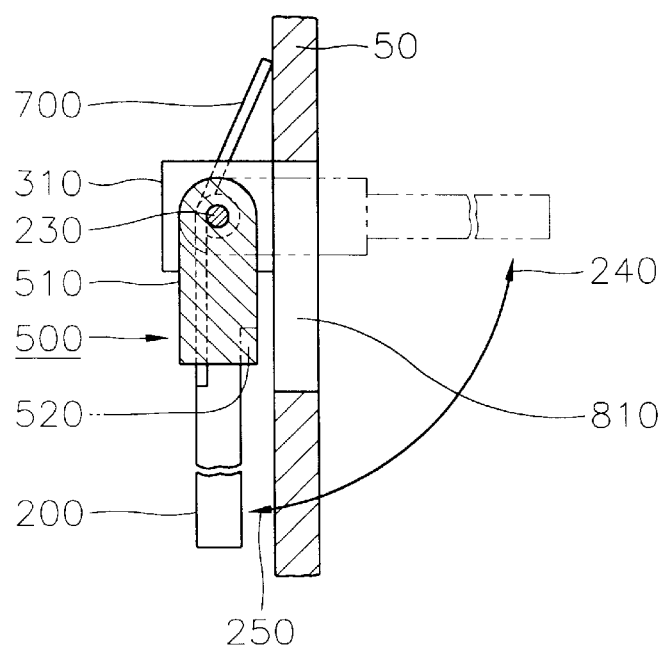
FIG. 7 is a cross-sectional view taken along line B—B of FIG. 4.

FIG. 7 shows done 200 and second flange 500 while the cassette is being ejected. When the cassette is entirely drawn out of the VCR through cassette inlet 800, door 200 that has been pivoted outward with respect to the VCR as shown in a dotted line in FIG. 7, that is in the direction or arrow 240, is pivoted inward with respect to the VCR, that is in the direction of arrow 250 by the force acting on the outer surface of door 200 by horizontal part 520 of second flange 500, which has been pivoted together with door 200 and passes through cutting hole 810 formed on cassette inlet 800. At this time, first flange 400 is maintained at the initial position by stopper 900. Thereafter, when door 200 reaches the initial position, door 200 and second flange 500 are stopped by first flange 400.

According to a preferred embodiment of the present invention, door 200 is located inside of the VCR and is part from the front wall of the VCR by a predetermined distance so that first and second springs 600 and 700 are easily supported at the inner surface of the front wall of the VCR, and stopper 900 is easily formed at the inner surface of the front wall of the VCR.

As described above, the apparatus for operating the front door of the VCR according to the present invention allows for easy insertion and ejection of the cassette so that there is no need for a separate element for pivoting the front door, such as a lever. Accordingly, the inner construction of the VCR is simplified and the cost for manufacturing the VCR is reduced.

In addition, the apparatus according to the present invention reduces the noise generated by the collision of a door and VCR case.

While the present invention has been particularly shown and described with reference to a particular embodiment thereof, it will be understood by those skilled in the art that various changes and modifications can be made within the scope of the invention as hereinafter claimed.

What is claimed is:

1. An apparatus for opening/closing a cassette inlet formed at a front wall of a video cassette recorder, the apparatus comprising:

a door;

a door supporting member formed at an upper portion of the door, the door supporting member being formed at first and second ends thereof with a first pivot shaft and a second pivot shaft, respectively, the first end being opposite to the second end, the first pivot shaft and the second pivot shaft extending in opposite directions from each other;

a first support structure for rotatably supporting the first pivot shaft;

a second support structure for rotatably supporting the second pivot shaft;

a return assembly for returning the door to an initial position when the door is pivoted inward with respect to the first support structure, the return assembly including a first flange rotatably disposed around the first pivot shaft, a first spring disposed around the first pivot shaft between the first flange and the first support structure, and a stopper for preventing the first flange from pivoting outward with respect to the first support structure beyond the initial position by abutting against the first flange when the first flange passes the initial position, the door for closing the cassette inlet door when the door is in the initial position; and a pivot assembly for pivoting the door inward with respect to the first support structure, the pivot assembly being provided between the second support structure and the door, wherein pivoting of the door inward with respect to the first support structure by the pivot assembly is stopped at the initial position by the return assembly.

2. The apparatus according to claim 1, wherein the first support structure includes a first bracket having a first blind hole, the second support structure includes a second bracket having a second blind hole, free ends of the first and the second pivot shafts are rotatably inserted into the first and the second blind holes, respectively, and the first and the second brackets are for being fixedly attached to an inner surface of the front wall of the video cassette recorder.

3. The apparatus according to claim 1, wherein the stopper is for being integrally formed with the inner surface of the front wall of the video cassette recorder, the stopper being positioned in correspondence to a position of the first flange.

4. The apparatus according to claim 1, wherein the first flange consists of a first vertical part and a first horizontal part which is integrally formed at a first lower portion of the first vertical part, and the first horizontal part makes contact with an inner wall of the front door.

5. The apparatus according to claim 4, wherein the first vertical part of the first flange is formed at a lower portion thereof with a first latch for latching a first end of the first spring, and a second end of the first spring is for being supported at the inner surface of the front wall of the video cassette recorder.

6. The apparatus according to claim 5, wherein the fourth means includes a second flange rotatably inserted around the second pivot shaft, a second spring which is positioned between the second flange and second means and surrounds the second pivot shaft, and a cutting hole for allowing the second flange to pivot outward with respect to the first support structure.

7. The apparatus according to claim 6, wherein the first and the second springs are torsion springs.

8. The apparatus according to claim 6, wherein the second flange consists of a second vertical part and a second horizontal part which is integrally formed at a second lower portion of the second vertical part, and the second horizontal part makes contact with an outer wall of the door.

9. The apparatus according to claim 8, wherein the second vertical part of the second flange is formed at a lower portion thereof with a second latch for latching a first end of the second spring, and a second end of the second spring is for being supported at the inner surface of the front wall of the video cassette recorder.

10. The apparatus according to claim 6, wherein the first spring has a first elasticity coefficient larger than a second elasticity coefficient of the second spring so that a first force acting on the front door by the first flange is larger than a second force acting on the front door by the second flange.

* * * * *